358-140. OR 3.196.207 SR SEARCH ROOM

July 20, 1965 E. DAVIES 3,196,207

TELEVISION STANDARDS CONVERSION APPARATUS HAVING TEMPORARILY INCREASED LINE SCANNING SPEEDS

Filed July 17, 1961

INVENTOR
Eric Davies;
BY Baldwin & Wight,
His ATTORNEYS

United States Patent Office 3,196,207

Patented July 20, 1965

3,196,207

TELEVISION STANDARDS CONVERSION APPARATUS HAVING TEMPORARILY INCREASED LINE SCANNING SPEEDS

Eric Davies, Danbury, England, assignor to The Marconi Company Limited, a British company Filed July 17, 1961, Ser. No. 124,468
Claims priority, application Great Britain, Sept. 5, 1960, 30,604/60
4 Claims. (Cl. 178—6.8)

Figure 1:
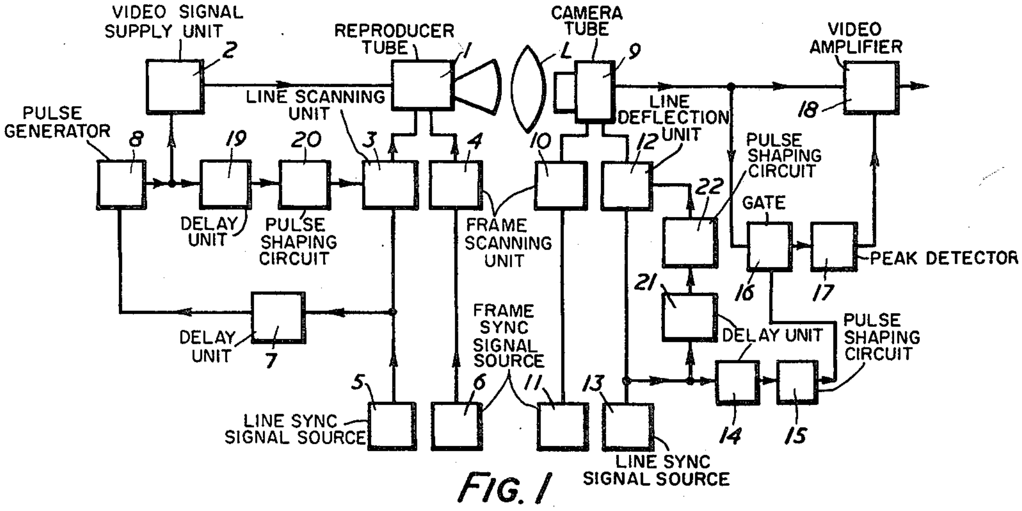

This invention relates to television standards conversion apparatus, that is to say to apparatus for converting television signals in accordance with one set of standards, e.g. 405 lines/frame and 50 frames/sec. (the present British standards), into corresponding signals in accordance with another set of standards, e.g. 525 lines/frame and 60 frames/sec. (the present U.S.A. standards).

The most usual form of standards conversion apparatus comprises a television reproducer tube and associated equipment for reproducing pictures from signals in accordance with one set of standards (hereinafter called the "input" standards) and a television camera which is operated in accordance with another set of standards (hereinafter called the "output" standards) and "looks at" the pictures on the reproducer tube to give output video signals in accordance with the output standards. As is well known, however, if the output video signals obtained from an apparatus as so far described are utilised, unaltered, for picture reproduction the resultant pictures will be marred by objectionable flicker effects due to the different standards employed in the camera and in the picture it "looks at." Thus, for example, if the input standard is the British standard and the output standard the U.S.A. one, pictures reproduced from the camera output signals unchanged will be most unsatisfactory, their principal defect being a pronounced flicker at 10 c./s.—the difference between the two frame frequencies. It is well known to avoid this defect by adding to the television signal waveform fed to the signal reproducer tube a line frequency pulse occurring during the so-called "back porch" of said waveform so as to provide, a little to one side of the reproduced picture proper, a "stripe" of constant brilliance (usually peak white) to serve as a reference stripe, signals due to this stripe and occurring in the output signals from the camera being used to control the gain of an amplifier for said output signals so as to eliminate or at any rate very greatly reduce the undesired flicker above mentioned. The present invention relates to television standards conversion apparatus of the type just exemplified, that is to say of the type in which an input signal reproducer tube, operated by a composite signal wave including a television signal wave in accordance with input standards and a superimposed reference-amplitude pulse occurring during the blanking period of said signal wave, produces a useful picture with a reference stripe just outside one frame direction edge thereof, said picture (and reference stripe) being viewed by a television camera, operated in accordance with output standards, and means, controlled by signals due to the viewing of said reference stripe, being provided for controlling the amplitude of video signals derived from said camera so as substantially to reduce or eliminate flicker effects present in those signals due to standard differences and primarily due to difference of frame frequency between the two standards.

The present invention seeks to avoid a defect which is present in television standards conversion apparatus of the type referred to and as at present known. In order that the invention may be the better understood this defect, which arises when certain (otherwise very desirable) forms of camera tube are employed, will first be described. As will be appreciated, the reference stripe—normally a peak-white stripe—produced on the reproducer tube of an apparatus of the type referred to is only just outside one edge of the picture proper. If, as is usual, the reference stripe is produced by a pulse inserted in the "back porch" of the input composite signal waveform, the reference stripe will be very close indeed to the adjacent edge of the picture proper. Now, as is well known, the Image Orthicon type of camera tube manifests, on its target, certain electron re-distribution effects which need not be described here beyond saying that they are of such a nature that if such a tube is employed to "look at" the picture and closely adjacent reference stripe reproduced as just described, the camera output signal produced when the camera tube scans across the reference stripe will not be dependent solely upon the brilliance of the said stripe but will also be dependent to some extent on the light and shade of the adjacent edge of the picture proper. This is, of course, most undesirable because the whole purpose of the provision of the reference stripe is to provide a reference component, independent of varying picture content, in the camera output for control of the output video signals to eliminate flicker effect and the extent to which the camera tube is unable to "see" the reference stripe without being affected by light and shade in the adjacent picture edge is a measure of the extent to which the aforesaid purpose is thwarted. Any tube possessing the above described property of the Image Orthicon tube will tend to be unsatisfactory for use in, and may be, indeed, quite unacceptable for use in television standards conversion apparatus of the type referred to, desirable though such types of tube are in other respects. The present invention seeks to overcome this difficulty and to enable such types of tube to be satisfactorily employed in television standards conversion apparatus of the type referred to.

According to this invention in its broadest aspect a television standards conversion apparatus of the type referred to comprises means for varying the speed of line deflection of the input signal reproducer tube during the blanking period of the composite signal waveform fed to said tube so as to increase that speed after termination of the superimposed reference amplitude pulse to a substantially higher value than that of the speed before such termination. The result achieved is, as will be seen, physically to displace the reference stripe away from the adjacent edge of the picture proper on the reproducer tube, because after the stripe-producing pulse has occurred the line scanning speed is temporarily increased for a brief period. Because of the displacement of the reference stripe away from the adjacent edge of the picture proper, an Image Orthicon or similar type of tube can be satisfactorily employed in the camera of an apparatus in accordance with this invention.

Theoretically the invention may be carried into practice without varying camera tube scanning line speed during the blanking period so long as difficulties are not encountered (or, if they are encountered, are overcome by suitable special methods) due to the fact that, if normal scanning is retained in the camera tube, the camera tube output pulses due to scanning of the reference stripe will be displaced in time as compared with their times of occurrence were the invention not employed. For obvious reasons, however, it is preferred to make the line scanning in the camera tube the counterpart of that in the reproducer tube, i.e. to provide means for varying the speed of line deflection in the camera tube during the blanking period so as to increase that speed over part of the blanking period in correspondence with the speed increase employed in reproducer tube line scanning.

Preferably the superimposed reference amplitude pulse is superimposed on the television signal wave in accordance with input standards during the back porch thereof and line scanning speed in the reproducer tube is increased sharply immediately after the termination of said pulse and until nearly the end of the blanking period.

A convenient way of varying the scanning line speed during the blanking period is by superimposing a suitably shaped pulse on the normal line scanning deflection saw tooth waveform but other ways of producing this result are, of course, possible.

The invention is illustrated in and further explained in connection with the accompanying drawings in which FIG. 1 is a block diagram of one embodiment of the invention and FIGS. 2, 3, 4 and 5 are explanatory graphical figures.

Referring to FIG. 1, the television standards conversion apparatus therein shown comprises a reproducer tube unit 1 which reproduces television signals in accordance with input standards and supplied to it from a video signal supply unit 2. Line and frame deflection is accomplished in any well known manner, preferably electromagnetically, by means of a line scanning unit 3 and a frame scanning unit 4 synchronised respectively by a line synchronising signal source 5 and a frame synchronising signal source 6. Line synchronising signals from the source 5 are fed to a phasing or delay unit 7 (which may be adjustable) and thence to a pulse generator 8 which produces pulses of suitable length and amplitude at the line frequency and occurring during the back porch. These pulses are superimposed on the usual composite television signal waveform provided by the unit 2 so that the resulting composite waveform is as typified in FIG. 3 where SP represents the usual line synchronising signal, RSP represents the superimposed pulse from the generator 8, BP is the back porch, and VS represents the video signals proper. The result of the application of the composite waveform of FIG. 3 to the reproducer tube unit 1 is illustrated conventionally in FIG. 2 from which it will be seen that there is a reference stripe (shown by the shaded line RS) closely adjacent one of the framing direction edges of the picture proper and outside the area of the picture propor. The reference stripe pulse RSP occurs in the blanking period (indicated by the reference BLP in FIG. 2), its phasing being adjusted so that it occurs during the back porch and its amplitude being adjusted so that the reference stripe RS is peak white.

Reproduced pictures are projected by an optical system represented by a lens L onto the image receiving screen of a camera tube unit 9 which is operated at the output standards and subjected to frame scanning by a frame deflection unit 10 synchronised by a frame synchronising signal source 11, and to line scanning by a line deflection unit 12 synchronised by a line synchronising signal source 13. Line synchronising signals from the source 13, after suitable phasing or delay by a phasing unit 14, which may be adjustable, are fed to a suitable shaping circuit 15 and employed to control the opening of a gate 16 to which output signals from the camera unit 9 are fed and which supplies its gated output to a peak detector 17 which in turn controls the gain of an amplifier 18 in the video signal output channel from the camera.

Figures 2, 3, 4, 5:
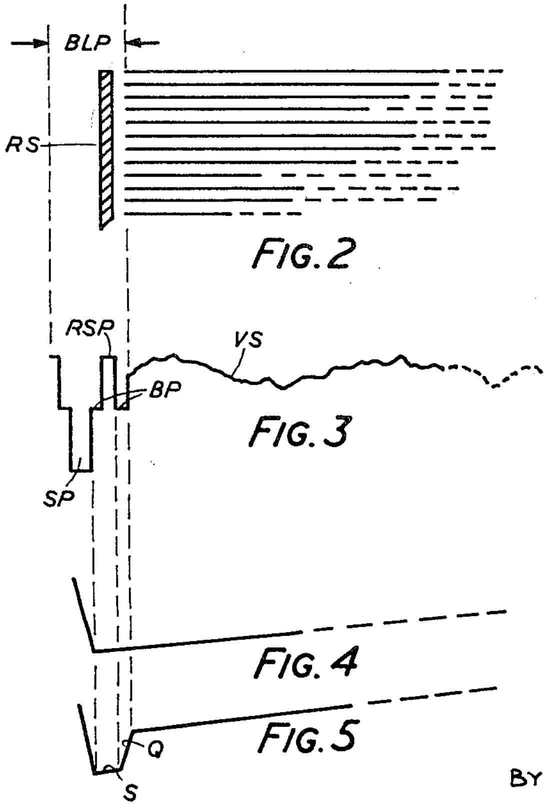

Assuming that the line scanning deflection is of normal kind in both reproducer and camera units, i.e. assuming that the line scanning deflection waveform is as represented in FIG. 4, the apparatus as so far described is a television standards conversion apparatus of the known type referred to. Reproduced pictures in accordance with the input standards and produced on the screen of the reproducer tube are "viewed" by the camera tube and the flicker which would result because of the different standards to which the two tubes are operated is avoided by reason of the control exercised on the gain of the amplifier 18 by control signals gated out by the gate 16 and occurring when the camera is scanning across the reference stripe RS (FIG. 2). As already explained, however, if the camera tube is an Image Orthicon tube or some other type of tube such that its output when scanning across the stripe RS is not independent of the light and shade in the adjacent edge portion of the reproduced picture proper, the gain control exercised on the amplifier 18 will not be correct and objectionable flicker effects will remain.

In accordance with this invention this difficulty is overcome by, in effect, moving the reference stripe further away from the picture proper on the reproducer tube so that the camera tube, when scanning across the reference stripe, is substantially unaffected in its signal output by the light and shade along the adjacent picture edge. In the embodiment illustrated the line scanning speed is varied in the same way in both reproducer and camera, being made faster than normal over a portion of the blanking period following the termination of the pulse which produces the reference stripe and reverting to normal over the scanning line proper, i.e. while the video signals proper are occurring. FIG. 5 which should be compared with FIGURE 4 shows the way in which the line scanning speed is varied at both reproducer and camera. As will be at once apparent from FIG. 5 the line scanning speed is normal over the portion S and above normal over the portion Q. The result is obviously to move the reference stripe RS in the reproducer tube further away from the picture proper, i.e. to the left of the position indicated by the shaded area RS in FIG. 2. Referring once more to FIG. 1, the variation in scanning line speed for the reproducer tube is obtained by feeding pulses from the generator 8 through a suitable phasing or delay unit 19 (which may be adjustable) and shaping circuit 20 to the line scanning unit 3 where they are superimposed upon the saw tooth pulses provided by the usual time base circuit (not separately shown) included in the unit 3. As will be obvious, the addition of a pulse of suitable duration, amplitude and shape to a waveform as shown in FIG. 4 will produce a waveform as shown in FIG. 5.

The deflection speed varying apparatus on the camera side is the counterpart of that just described. Line synchronising pulses from the unit 13, after suitable phasing or delay in a unit 21 (which may be adjustable) and appropriate shaping in a shaping circuit 22, are superimposed in the line deflection unit 12 upon the saw tooth deflection waves provided by the customary saw tooth time base circuit (not separately shown) included in the said unit 12.

I claim:

1. In a television standards conversion apparatus including an input signal reproducer tube, means for supplying a composite signal wave including a television signal wave in accordance with input standards and a superimposed reference amplitude pulse during the blanking period of said signal wave to said tube for producing a useful picture with a reference stripe just outside one frame direction edge thereof, a television camera positioned to view said picture and stripe, operated in accordance with output standards, and means coupled to said camera and controlled by signals due to the viewing of said reference stripe, for controlling the amplitude of video signals derived from said camera so as substantially to reduce or eliminate flicker effects present in those signals due to standard differences and primarily due to difference of frame frequency between the two standards, said apparatus comprising means for varying the speed of line deflection of the input signal reproducer tube during the blanking period of the composite signal waveform to increase that speed after termination of the superimposed reference amplitude pulse to a substantially higher value than that of the speed before such termination.

2. An apparatus as claimed in claim 1 further including means for varying the speed of line deflection in said camera tube during the blanking period to increase line deflection speed over part of the blanking period in proportion to the speed increase employed in reproducer tube line scanning.

3. An apparatus as claimed in claim 1, wherein said means for supplying a composite signal wave including a television signal wave and a superimposed reference amplitude pulse superimposes the reference amplitude pulse on the television signal wave in accordance with input standards during the back porch thereof, and wherein the increase in line deflection speed in the reproducer tube occurs during the period between the termination of said pulse and the end of the blanking period.

4. An apparatus as claimed in claim 1, wherein said means for varying the speed of line deflection of the reproducer tube includes sawtooth line scanning means coupled to said reproducer tube and means for superimposing a shaped pulse on the sawtooth wave from said line scanning means.

No references cited.

DAVID G. REDINBAUGH, *Primary Examiner.*

ROY LAKE, *Examiner.*